United States Patent
Eri et al.

(10) Patent No.: US 7,351,679 B2
(45) Date of Patent: Apr. 1, 2008

(54) FISCHER-TROPSCH CATALYST, PREPARATION, AND USE THEREOF

(75) Inventors: Sigrid Eri, Ranheim (NO); Keijo J. Kinnari, Sola (NO); Dag Schanke, Trondheim (NO); Anne-Mette Hilmen, Bjørnemyr (NO)

(73) Assignee: Statoil ASA, Stavanger (NO)

( * ) Notice: Subject to any disclaimer, the term of this patent is extended or adjusted under 35 U.S.C. 154(b) by 95 days.

(21) Appl. No.: 10/433,846

(22) PCT Filed: Dec. 11, 2001

(86) PCT No.: PCT/GB01/05461

§ 371 (c)(1), (2), (4) Date: Nov. 10, 2003

(87) PCT Pub. No.: WO02/47816

PCT Pub. Date: Jun. 20, 2002

(65) Prior Publication Data

US 2004/0077737 A1   Apr. 22, 2004

(30) Foreign Application Priority Data

Dec. 11, 2000 (GB) ................................. 0030170.5

(51) Int. Cl.
- B01J 23/40 (2006.01)
- B01J 23/42 (2006.01)
- B01J 21/00 (2006.01)
- B01J 20/00 (2006.01)
- B01J 23/02 (2006.01)

(52) U.S. Cl. ................ 502/327; 502/332; 502/333; 502/334; 502/339; 502/355; 502/415; 502/439

(58) Field of Classification Search ................ 502/327, 502/332–334, 339, 355, 415, 439
See application file for complete search history.

(56) References Cited

U.S. PATENT DOCUMENTS

| | | | |
|---|---|---|---|
| 2,548,159 A | | 4/1951 | Houtman et al. |
| 2,830,877 A | * | 4/1958 | Appell ........................ 423/22 |
| 2,982,793 A | * | 5/1961 | Turner et al. ............... 585/277 |
| 3,025,248 A | * | 3/1962 | Rosinski et al. ............ 502/334 |
| 3,068,303 A | * | 12/1962 | Pattison ...................... 585/260 |
| 3,331,787 A | * | 7/1967 | Bair et al. .................. 502/223 |
| 3,397,154 A | * | 8/1968 | Talsma ....................... 502/304 |
| 3,565,830 A | * | 2/1971 | Keith et al. ................. 502/242 |
| 3,840,471 A | * | 10/1974 | Acres ......................... 502/177 |
| 4,200,552 A | * | 4/1980 | Noguchi et al. ............ 502/263 |

(Continued)

OTHER PUBLICATIONS

Tang et al., "Partial Oxidation of Methane to Synthesis Gas Over Alpha-LA2O3-Supported Bimetallic PT-CO Catalysts", Catalysis Letters, Baltzer, Scientific Publ., Basel, CH, vol. 59, No. 2/4, Jun. 1999, pp. 129-135.

(Continued)

*Primary Examiner*—Cam N. Nguyen
(74) *Attorney, Agent, or Firm*—Patterson, Thuente, Skaar & Christensen, P.A.

(57) ABSTRACT

Embodiments include a catalyst for use in a Fischer-Tropsch synthesis reaction which comprises cobalt supported on alumina. In some embodiments, the alumina support may have specific surface area of less than 50 m²/g and/or may be least 10% α-alumina.

18 Claims, 5 Drawing Sheets

U.S. PATENT DOCUMENTS

| | | | |
|---|---|---|---|
| 4,237,030 A * | 12/1980 | Noguchi et al. | 502/207 |
| 4,440,956 A * | 4/1984 | Couvillion | 585/260 |
| 4,610,975 A | 9/1986 | Baker et al. | |
| 4,626,521 A | 12/1986 | Murib | |
| 4,801,573 A * | 1/1989 | Eri et al. | 502/302 |
| 4,801,620 A | 1/1989 | Fujitani et al. | |
| 4,857,559 A * | 8/1989 | Eri et al. | 518/700 |
| 4,870,044 A * | 9/1989 | Kukes et al. | 502/220 |
| 4,880,763 A * | 11/1989 | Eri et al. | 502/302 |
| 4,895,816 A * | 1/1990 | Gardner et al. | 502/10 |
| 4,957,896 A * | 9/1990 | Matsumoto et al. | 502/304 |
| 5,100,859 A * | 3/1992 | Gerdes et al. | 502/439 |
| 5,102,851 A * | 4/1992 | Eri et al. | 502/302 |
| 5,116,879 A | 5/1992 | Eri et al. | 518/716 |
| 5,380,697 A * | 1/1995 | Matusz et al. | 502/348 |
| 5,851,948 A * | 12/1998 | Chuang et al. | 502/314 |
| 5,856,263 A * | 1/1999 | Bhasin et al. | 502/333 |
| 5,874,381 A * | 2/1999 | Bonne et al. | 502/327 |
| 5,977,012 A * | 11/1999 | Kharas et al. | 502/326 |
| 6,022,755 A | 2/2000 | Kinnari et al. | |
| 6,537,945 B2 * | 3/2003 | Singleton et al. | 502/327 |
| 6,596,667 B2 * | 7/2003 | Bellussi et al. | 502/332 |
| 6,689,819 B2 * | 2/2004 | Bellussi et al. | 518/715 |
| 6,835,690 B2 * | 12/2004 | Van Berge et al. | 502/328 |
| 6,927,190 B2 * | 8/2005 | Lok et al. | 502/327 |

OTHER PUBLICATIONS

Oukaci et al., "Comparison of patented Co F-T catalysts using fixed-bed and slurry bubble column reactors", Applied Catalysis A: General, Elsevier Science, Amsterdam, NL, vol. 186, No. 1-2, Oct. 4, 1999, pp. 120-144.

* cited by examiner

FISCHER-TROPSCH CATALYST, PREPARATION, AND USE THEREOF

RELATED APPLICATIONS

This application is a 35 U.S.C. 371 filing of PCT Application No. PCT/GB01/05461, filed Dec. 11, 2001, which claims benefit of GB 0030170.5, filed Dec. 11, 2000, both of which are hereby incorporated by reference herein.

FIELD OF USE

The present invention relates to Fischer-Tropsch (F-T) catalysts, their use in F-T synthesis reactions, methods of their use and methods of their manufacture.

BACKGROUND

Conversion of natural gas to liquid hydrocarbons ("Gas To Liquids" or "GTL" process) is based on a 3 step procedure consisting of: 1) synthesis gas production; 2) synthesis gas conversion by FT synthesis; and 3) upgrading of FT products (wax and naphtha/distillates) to final products such as naphtha, kerosene, diesel or other products, for example lube oil base.

Supported cobalt catalysts are the preferred catalysts for the FT synthesis. The most important properties of a cobalt FT catalyst are the activity, the selectivity usually to C5 and heavier products and the resistance towards deactivation. Known catalysts are typically based on titania, silica or alumina supports and various metals and metal oxides have been shown to be useful as promoters.

A recent series of papers by Iglesia et al. including "Selectivity Control and Catalyst Design in the Fischer-Tropsch Synthesis: Sites, Pellets and Reactors" Advances in Catalysis, Vol. 39, 1993, p. 221-302, has given a description of the reaction network leading to various hydrocarbon products and a methodology to optimize catalyst properties towards the desired heavy hydrocarbons. The maximum $C_5$+ selectivity is obtained by designing catalyst pellets with optimum intraparticle diffusion resistance. This is achieved by increasing intraparticle diffusion resistance to the point where secondary chain building reactions of primary products (alpha-olefins) are maximized without inducing significant diffusion resistance on the reactants ($H_2$, CO) because this will lead to poor selectivity. This principle is shown to be generally applicable on all the supports mentioned above. By plotting different catalysts with different physical properties (particle size, porosity, cobalt loading, cobalt dispersion) a typical "volcano plot" is generated and the maximum $C_5$+ selectivity is found for intermediate values of a parameter "$\chi$" which is a function of the parameters mentioned above and is a measure of the intraparticle diffusion resistance at a given set of reaction conditions.

Definition of $\chi$:

$$\chi = R_0^2 \varnothing \theta / r_p \quad (1)$$

where:
 $R_0$=Catalyst particle radius (m)
 $\varnothing$=Catalyst porosity
 $\theta$=Catalytic site density (sites/m$^2$)
 $r_p$=average pore radius (m)

According to Iglesia the optimum value of $\chi$ for a typical set of FT reaction conditions (200° C., 20 bar, $H_2$/CO=2.1, 50-60% conversion) is about 500-1000×10$^{-16}$ m$^{-1}$, irrespective of the nature of the catalyst support used. From the definition of $\chi$ it appears that any of the parameters involved (particle radius, porosity, pore radius or site density) can be varied to achieve the desired value of $\chi$. However, this is somewhat misleading due to the known relationship between specific surface area, pore radius and porosity (or specific pore volume). By introducing these relationships, it will be seen that $\chi$ can be described by the particle size, the cobalt loading, the cobalt dispersion and the porosity. Thus, it can be seen that $\chi$ is actually independent of pore radius and site density and is determined only by the volumetric transport parameter which is controlled solely by particle size, the cobalt loading, the cobalt dispersion and the porosity.

The following known equations are valid for an ideal cylindrical pore structure:

$$r_p = 2V_g/S_g \quad (2)$$

$$V_g = \varnothing/\rho_p \quad (3)$$

$$\rho_p = (1-\varnothing)\rho_s \quad (4)$$

where
 $V_g$=specific pore volume (cm$^3$/g)
 $S_g$=specific surface area (m$^2$/g)
 $\rho_p$=particle density (g/cm$^3$)
 $\rho_s$=material density (g/cm$^3$)

The site density term in (1) ($\theta$=Co sites/m$^2$) can be expressed by:

$$\theta = \text{Co sites/m}^2 \text{surface area} = X_{Co}D_{Co}A/S_gM_{Co} \quad (5)$$

where
 $X_{Co}$=Total Co concentration in catalyst ($g_{Co}/g_{cat}$)
 $D_{Co}$=Co dispersion (fraction of total Co exposed)
 A=Avogadro number=6.23 10$^{23}$ atoms/mole
 $M_{Co}$=Co molecular weight=58.9 g/mole By combining equations (2)-(5) with (1) it can be shown that $\chi$ can be written as:

$$\chi = R_0^2 X_{Co} D_{Co} A (1-\varnothing) \rho_s / 2M_{Co} \quad (6)$$

It is apparent from (6) that $\chi$ actually is independent of pore radius and only depends on the volumetric density of sites in the free pore volume of the catalyst. It is also clear that due to the second order dependency on particle size, the easiest way of controlling $\chi$ is to vary the particle size.

If a cobalt catalyst is to be used in a fixed-bed type reactor it is necessary to use particle sizes of 1 mm or larger in order to avoid unacceptable pressure drop over the reactor. However, the value of $\chi$ is then far too high to achieve optimum selectivity, due to high reactant diffusion resistance. This can to a certain extent be addressed by the use of so called eggshell or rim type catalysts where the active cobalt containing phase is located in a relatively thin region in the outer shell of the support. However, in slurry type reactors, it is necessary to employ much smaller particles, typically 10-100 µm. It is then easily seen that it will be extremely difficult to achieve $\chi$ values in the desired region. For example, a catalyst with 10 weight % cobalt loading, 5% Co dispersion, 50% porosity and 50 micron particles will have $\chi$=13×10$^{16}$ m$^{-1}$.

It should also be kept in mind that the parameters in eq. (6) can generally not be changed independently, i.e. the higher Co loading the more difficult it is to achieve a high dispersion. Moreover, the lower the porosity the more difficult it becomes to use a high cobalt loading. A combination of 20 weight % cobalt loading, 10% Co dispersion and 30% porosity gives a higher volumetric cobalt density than can be seen in any reference known to the applicants. The corresponding value of $\chi$ for a 50 µm particle (which is suitable for slurry reactor operation) will then be $75\times10^{16}$ m$^{-1}$, which is still far lower than the optimum value taught by Iglesia.

Thus, there is no apparent teaching for preparing high selectivity catalysts for use with small particle sizes, such as are encountered in slurry reactors.

SUMMARY OF THE INVENTION

The applicants have concluded a series of experiments to investigate the effect of $\chi$ on selectivity using a rhenium promoted cobalt on alumina support catalyst. These show only limited optimization potential by changing $\chi$ through changing the particle size. The results are shown in FIG. 1. FIG. 1 shows the effect $\chi$ on selectivity using 20%Co 1%Re/$\gamma$-Al$_2$O$_3$ catalyst (8% dispersion, 60% porosity, average particle size (microns): 46, 113, 225, 363, 638). Fixed bed reactor tests were conducted at: 200° C., 20 bar, H$_2$/CO=2.1, 50-70% conversion, >24 h on stream. All data have been replicated 2 or more times.

Iglesia suggests that the C$_5$+ selectivity can be increased by decreasing the relative density or reactivity of olefin hydrogenation vs. olefin readsorption sites. This effect is a direct consequence of the formulation of the reaction network. However, no guidance is given as to how this change can be built into a real catalyst.

It is an object of the present invention to provide a F-T catalyst for use in slurry reactors with improved selectivity to C$_5$+ hydrocarbon.

One of the requirements of a catalyst for use in a slurry reactor is that the particles of catalyst should retain their structural integrity. Catalysts which are supported on titania are relatively weak and though encouraging results have been achieved from the point of view of selectivity, there may be a tendency for titania-supported cobalt catalysts to disintegrate upon prolonged use. Alumina has an inherently stronger resistance against attrition and break-up of the catalyst particles than titania and is thus a more preferred support material from the point of view of mechanical properties.

According to one aspect of the present invention, there is provided a catalyst for use in a Fischer-Tropsch synthesis reaction which comprises cobalt supported on alumina, in which the alumina support has a specific surface area of <50 m$^2$/g preferably <30 m$^2$/g, but preferably not below 5 m$^2$/g.

Preferably, the alumina is at least 50% alpha-alumina, with the remainder being gamma- and/or theta-alumina, preferably, predominantly theta-alumina. Preferably, it is at least 80% or even substantially pure alpha-alumina.

Preferably, the cobalt represents from 3 to 35% by weight of the catalyst, more preferably from 5 to 20% by weight. The catalyst may also include up to 2% by weight of rhenium, e.g. 0.25 to 1% or 0.25 to 0.5% rhenium. Other known metallic promoters/dopants such as platinum, rhodium, iridium and palladium may also be included, preferably at the same levels, as well as oxide promoters/dopants such as rare earth oxides and alkali metal oxides.

According to another aspect of the present invention, there is provided a method of manufacturing a Fischer-Tropsch catalyst which comprises heat treating alumina particles at a temperature in the range of 700 to 1300° C. for a period of between 1 and 15 hours; and impregnating the heat treated alumina particles with cobalt and any desired promoters/dopants. Preferably, the treatment temperature is in the range of 900 to 1200° C. and the treatment period is between 5 and 10 hours.

The invention also extends to the use of a catalyst according to the first aspect of the invention in a F-T synthesis reaction. This may suitably be carried out in a slurry bubble column reactor.

The invention also extends to a method of converting natural gas to C$_5$+ hydrocarbons, which comprises; subjecting a natural gas feed stream to a reforming reaction to produce a synthesis gas feed stream of hydrocarbon and carbon monoxide; subjecting the synthesis gas feed stream to a Fischer-Tropsch synthesis reaction in the presence of a catalyst according to the first aspect; and separating a product stream including C$_5$+ hydrocarbons.

The method of depositing the active metal, the metallic promoters, the alkali and the rare earth oxide on the alumina support is not critical, and can be chosen from various methods well known to those skilled in the art. One suitable method that has been employed is known as incipient wetness impregnation. In this method the metal salts are dissolved in an amount of a suitable solvent just sufficient to fill the pores of the catalyst. In another method, the metal oxides or hydroxides are coprecipitated from an aqueous solution by adding a precipitating agent. In still another method, the metal salts are mixed with the wet support in a suitable blender to obtain a substantially homogenous mixture. In the present invention, if incipient wetness impregnation is used, the catalytically active metal and the promoters can be deposited on the support using an aqueous or an organic solution. Suitable organic solvents include, for example, acetone, methanol, ethanol, dimethyl formamide, diethyl ether, cyclohexane, xylene and tetrahydrofuran.

Suitable cobalt compounds include, for example, cobalt nitrate, cobalt acetate, cobalt chloride and cobalt carbonyl, with the nitrate being the most preferable when impregnating from an aqueous solution. Suitable rhenium compounds include, for example, rhenium oxide, rheninum chloride and perrhenic acid. Perrhenic acid is the preferred compound when preparing a catalyst using an aqueous solution. Suitable platinum, iridium and rhodium compounds include, for example, mitrates, chlorides and complexes with ammonia. Suitable alkali salts for incorporating the alkali into the catalyst include, for example, the nitrates, chlorides, carbonates, and hydroxides. The rare earth oxide promoter can suitably be incorporated into the catalyst in the form, for example, of the nitrate or chloride.

After aqueous impregnation, the catalyst is dried at 110° C. to 120° C. for 3 to 6 hours. When impregnating from organic solvents, the catalyst is preferably first dried in a rotary evaporator apparatus at 50° C. to 60° C. under low pressure, then dried at 110° C. to 120° C. for several hours longer.

The dried catalyst is calcined in air by slowly increasing the temperature to an upper limit of between 200° C. and 500° C., preferably between 250° C. and 350° C. The rate of temperature increase is preferably between 0.5° C. and 2° C. per minute, and the catalyst is held at the highest temperature for a period of 1 to 24 and preferably 2 to 16 hours. The impregnation procedure is repeated as many times as necessary to obtain a catalyst with the desired metals content. Cobalt, rhenium, alkali and the rare earth oxide promoter, if present, can be impregnated together, or in separate steps. If separate steps are used, the order of impregnating the active components can be varied.

Before use, the calcined catalyst is preferably reduced with hydrogen. This can be suitably carried out by flowing hydrogen at a space velocity of at least 1000 Ncm$^3$/g. The temperature is slowly increased from ambient to a maximum level of 250° C. to 450° C., preferably between 300° C. and 400° C., and maintained at the maximum temperature for about 1 to 24 hours, more preferably 5 to 16 hours.

The reactor used for the synthesis of hydrocarbons from synthesis gas can be chosen from various types well known to those skilled in the art, for example, fixed bed, fluidized bed, ebullating bed or slurry. The catalyst particle size for the fixed or ebullating bed is preferably between 0.1 and 10 mm and more preferably between 0.5 and 5 mm. For the other types of operations a particle size between 0.01 and 0.2 mm is preferred.

The synthesis gas is a mixture of carbon monoxide and hydrogen and can be obtained from any source known to those skilled in the art, such as, for example, steam reforming of natural gas or partial oxidation of coal. The molar ratio of $H_2$:CO is preferably between 1:1 to 3:1; and more preferably between 1.5:1 to 2.5:1. Carbon dioxide is not a desired feed component for use with the catalyst of this invention, but it does not adversely affect the activity of the catalyst. All sulfur compounds must, on the other hand, be held to very low levels in the feed, preferably below 100 ppb.

The reaction temperature is suitably between 150° C. and 300° C., and more preferably between 175° C. and 250° C. The total pressure can be from atmospheric to around 100 atmospheres, preferably between 1 and 50 atmospheres. The gaseous hourly space velocity, based on the total amount of synthesis gas feed, is preferably between 100 and 20,000 $cm^3$ of gas per gram of catalyst per hour; and more preferably from 1000 to 10,000 $cm^3/g/h$, where gaseous hourly space velocity is defined as the volume of synthesis gas (measured at standard temperature and pressure) fed per unit weight of catalyst per hour.

The reaction products are a complicated mixture, but the main reaction can be illustrated by the following equation:

$$nCO + 2nH_2 \rightarrow (-CH_2-)_n + nH_2O$$

where $(-CH_2-)_n$ represents a straight chain hydrocarbon of carbon number n. Carbon number refers to the number of carbon atoms making up the main skeleton of the molecule. In F-T synthesis, the products are generally either paraffins, olefins, or alcohols. Products range in carbon number from one to 50 or higher.

In addition, with many catalysts, for example, those based on iron, the water gas shift reaction is a well known side reaction:

$$CO + H_2O \rightarrow H_2 + CO_2$$

With cobalt catalysts the rate of this last reaction is usually very low.

The hydrocarbon products from Fischer-Tropsch synthesis are distributed from methane to high boiling compounds according to the so called Schulz-Flory distribution, well known to those skilled in the art. The Schulz-Flory distribution is expressed mathematically by the Schulz-Flory equation:

$$W_n = (1-\alpha)^2 n \alpha^{n-1}$$

where n represents carbon number, $\alpha$ is the Schulz-Flory distribution factor which represents the ratio of the rate of chain propagation to the rate of chain propagation plus the rate of chain termination, and $W_n$ represents the weight fraction of product of carbon number n. This equation shows that an increased $\alpha$ results in a higher average carbon number of the products. Higher $\alpha$ values are desirable when heavier products, such as diesel fuel, are relatively more valuable than lighter products, such as naphtha and light gases.

The invention is therefore concerned with the preparation and use in FT synthesis of a cobalt supported catalyst on low surface area alumina for optimizing $C_5+$ selectivities. This is preferably achieved by heat treatment of high surface area aluminas to achieve the desired surface areas, but it is understood that any means of achieving materials with such properties are covered by the invention. Another advantage of the invention is the surprisingly high activity and high resistance towards deactivation of the described materials.

The invention describes catalytic materials that can be used in any type of FT reactor that is suitable for synthesis of heavy hydrocarbons (e.g. fixed-bed and slurry reactors). It should be understood that any combination of cobalt and suitable promoters (such as Re, Pt or other suitable components) will benefit from the use of the low surface area alumina supports, including unpromoted cobalt catalysts.

The catalysts of the invention provide a way to achieve high C5+ selectivities at low values of $\chi$, i.e. at low values of intraparticle diffusion resistance. Thus, these catalysts circumvent the limitations imposed by the teaching of Iglesia. It has been discovered that cobalt supported on low surface area alumina can achieve substantially improved C5+ selectivities in FT synthesis compared to high surface area alumina, even at low values of $\chi$. This has been achieved by heat treatment of high surface area aluminas to achieve the desired surface areas. The results of tests conducted indicate that the increase in C5+ selectivity may be at least partially attributable to a reduced olefin hydrogenation activity relative to the main FT synthesis activity.

It has also been discovered that these catalysts, in spite of the low surface area available for impregnation of active components have an activity which is higher than comparable high surface area (HSA) catalysts at conditions which simulate high conversion in a slurry bubble column reactor (i.e. at high and uniform water partial pressures). In fact, the low surface area catalyst activity is close to the activity of a high surface area catalyst with higher Co loading.

In the low surface area catalyst, the loss of activity per unit time is not affected but there is a reversible step change upwards in activity for the low surface area catalyst which is not observed for the HSA catalyst.

A further benefit over known technology is that since the composition of the wax is displaced towards the heavy side (higher $\alpha$ value), this leads to an increase in the middle distillate yield or lube oil base when the wax is hydrocracked or hydroisomerised in a downstream process. The consequence of this in a total GTL process is that the recycle of unconverted gas back to the natural gas reforming section can be reduced, the overall efficiency of the process can be increased (i.e. $CO_2$ emissions will be reduced) and the oxygen consumption can be reduced. Still further, it has been discovered that the catalysts according to the invention show a reduced water-gas-shift activity, leading to decreased undesired $CO_2$ production.

The invention may be carried into practice in various ways and will now be illustrated by the following examples.

DETAILED DESCRIPTION OF THE PREFERRED EMBODIMENTS

Example 1

Catalyst Preparation

Figure 1:
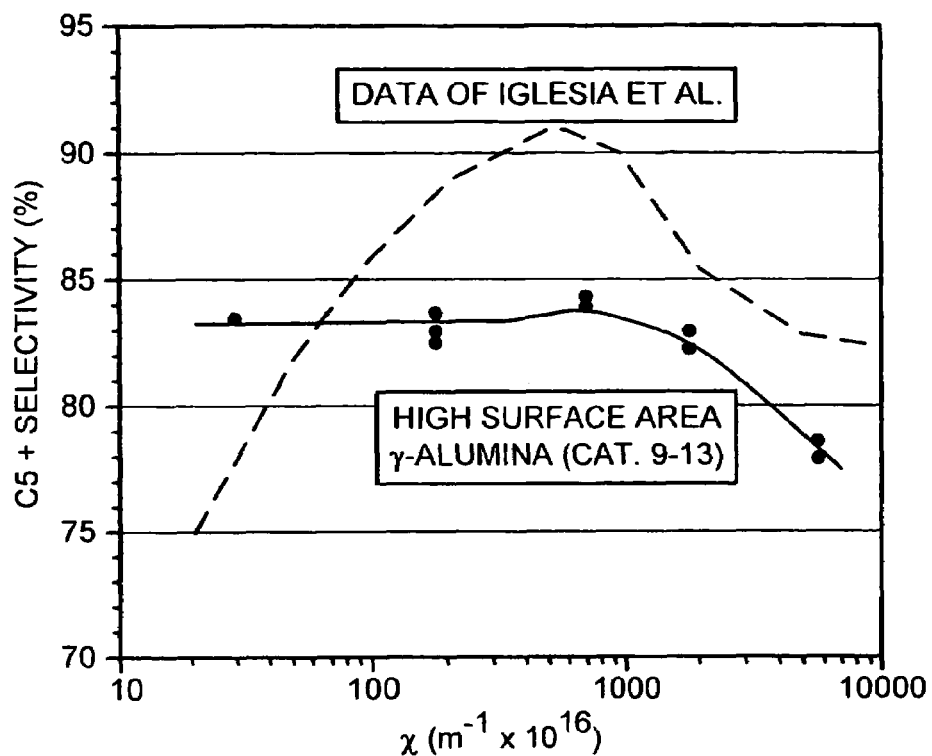
FIG. 1 is a graph showing the effect of $\chi$ on $C_5+$ selectivity.

The catalysts were prepared as follows: A solution was prepared by dissolving a given amount of cobalt nitrate, $Co(NO_3)_2 \cdot 6H_2O$ and in some of the catalysts also perrhenic acid, $HReO_4$ or tetra amin platinum nitrate, $Pt(NH_3)_4(NO_3)_2$ in a given amount of distilled water. The total solution was added with stirring to a given amount of Condea Puralox SCCa 45/190 alumina treated in air at different temperatures prior to impregnation, and the amount of solution added to the alumina was sufficient to achieve incipient wetness. The prepared catalysts were dried for 3 hours in an oven at a temperature of 110° C. The dried catalysts were then calcined in air by raising its temperature at a heating rate of 2°/minute to 300° C. and holding at this temperature for 16 hours. After calcination the catalysts were screened to the desired particle size. The amounts used in preparation and the content of the prepared catalysts are given in table 1a.

TABLE 1a

Catalyst preparation data of $Al_2O_3$ supported catalysts. Catalysts written in bold are according to the invention. Other materials are included for comparison.

| Cat. | Co(NO₃) 6H₂O (g) | HReO₄ (g) | Pt(NH₃)₄ (NO₃)₂ (g) | Water (ml) | Al₂O₃ (g) | Al₂O₃**** treatment (° C.) | Catalyst composition (%) | Particle size (microns) |
|---|---|---|---|---|---|---|---|---|
| 1 | 1077.93 | 17.93 | | 1 070 | 826*** | 500 | 20% Co-1% Re | 38-53 |
| 2 | 17.18 | 0.23 | | 30 | 25 | 500 | 12% Co-0.5% Re | 53-75 |
| 2b | 11.49 | — | | 21 | 17 | 500 | 12% Co | 53-90 |
| 2c | 133.39 | — | | 108 | | 500 | 20% Co | 53-90 |
| 2d | 130.83 | 2.17 | | 105 | | 500 | 20% Co-1% Re | 53-90 |
| 3 | 16.93 | 0.23 | | 22 | 25 | 1 100 | 12% Co-0.5% Re | 53-90 |
| 4 | 11.40 | 0.16 | | 12 | 17 | 1 150 | 12% Co-0.5% Re | 53-90 |
| 4b | 16.95 | — | | 18 | 25 | 1 150 | 12% Co | 53-90 |
| 5 | 2.61 | 0.04 | | 7 | 10 | 1 150 | 5% Co-0.25% Re | 53-90 |
| 6 | 4.31 | 0.08 | | 7 | 10 | 1 150 | 8% Co-0.4% Re | 53-90 |
| 7 | 5.52 | 0.09 | | 7 | 10 | 1 150 | 10% C0-0.5% Re | 53-90 |
| 8* | 62.68 | 1.05 | | 38 | 50 | 1 150 | 20% Co-1% Re | 53-90 |
| 9 | n.a. | n.a. | | n.a. | 10 000 | 500 | 20% Co-1% Re** | 38-53 |
| 10 | | | | | | | | 75-150 |
| 11 | | | | | | | | 150-300 |
| 12 | | | | | | | | 300-425 |
| 13 | | | | | | | | 425-850 |
| 13b | 10.16 | 0.14 | | 9 | 15 | 1 150 | 12% Co-0.5% Re | 75-150 |
| 13c | 10.16 | 0.14 | | 9 | 15 | 1 150 | 12% Co-0.5% Re | 150-300 |
| 13d | 10.16 | 0.14 | | 9 | 15 | 1 150 | 12% Co-0.5% Re | 425-850 |
| 14 | 16.89 | — | 0.17 | 18 | 25 | 1 150 | 12% Co-0.3% Pt | 53-90 |
| 15 | 16.89 | — | 0.17 | 30 | 25 | 500 | 12% Co-0.3% Pt | 53-90 |
| 16 | 271.41 | 3.73 | | 340 | 400 | 1130 | 12% Co-0.5% Re | 38-53 |

*Two-step impregnation to achieve 20% Co by incipient wetness.
**Catalysts also containing 1% rare earth oxide (impregnated as $La(NO_3)_2 \cdot 6H_2O$)
***Condea Catapal support.
****The $Al_2O_3$ treatment temperature was gradually increased to the desired temperature over a period of 6 hours and then kept at the desired temperature for 10 hours.

Catalysts 9-13 are different particle sizes of the same catalyst, of which the particle sizes are made by tabletising the powder before crushing and screening. The catalyst (2×5 kg) was prepared by incipient wetness in a mixer, drying at 120° C. for 2 hours and calcining at 300° C. for 3 hours.

catalysts can not be increased significantly by variation of $\chi$(particle size) from low (<100·10$^{16}$ m$^{-1}$) to intermediate values (500-1000·10$^{16}$ m$^{-1}$) and other methods are thus evidently needed to increase the C5+ selectivity of alumina supported Co catalysts.

TABLE 1b

Properties and results from catalytic tests of materials described in table 1.
Reaction conditions: Fixed-bed reactor at 200° C., 20 bar, feed
$H_2/CO = 2.1$, 50-70% conversion, >24 hrs onstream

| Cat. | Composition (wt %) | Support treatment temp. (° C.) | Alumina phase (% α) | Surface area (m²/g) | Porosity | Co dispersion (%) | Mean particle size (microns) | $\chi$ m$^{-1}$ (× 10$^{16}$) | GHSV[2] (h$^{-1}$) | CO conv. (%) | Reaction rate[3] (g/g/h) | Selectivity[1] (%) CH$_4$ | C$_2$-C$_4$ | C$_5$+ |
|---|---|---|---|---|---|---|---|---|---|---|---|---|---|---|
| 9 | 20% Co-1% Re*⁾ | 500 | 0 | 182 | 0.60 | 8 | 46 | 29 | 2 650 | 57 | 0.3 | 6 | 10.4 | 83.5 |
| 10 | 20% Co-1% Re*⁾ | 500 | 0 | 182 | 0.60 | 8 | 112 | 177 | 2 380 | 57 | 0.27 | 6.1 | 10.8 | 83.1 |
| 11 | 20% Co-1% Re*⁾ | 500 | 0 | 182 | 0.60 | 8 | 225 | 707 | 2 500 | 62 | 0.31 | 5.9 | 9.8 | 84.2 |
| 12 | 20% Co-1% Re*⁾ | 500 | 0 | 182 | 0.60 | 8 | 363 | 1 836 | 2 750 | 63 | 0.34 | 7.5 | 9.9 | 82.7 |
| 13 | 20% Co-1% Re*⁾ | 500 | 0 | 182 | 0.60 | 8 | 638 | 5 678 | 3 300 | 53 | 0.35 | 12.9 | 8.8 | 78.3 |

*⁾Catalysts containing also 1% rare earth oxide (La$_2$O$_3$).
[1]Carbon selectivity, CO$_2$ free basis. (<1% CO$_2$ in all experiments)
[2]Space velocity: Ncm³ (H$_2$ + CO + inerts)/g catalyst/hour. (3 vol % inerts (N$_2$) were used in all tests)
[3]g C$_1$+ hydrocarbons per g of catalyst per hour Example 2

Cobalt Catalysts Supported on High Surface Area Alumina With Varying Particle Size Catalysts 9-13 in Table 1 were tested in an isothermal fixed-bed microreactor. The reactor was 25 cm long and had an inner diameter of 1 cm. Each catalyst was given a pretreatment consisting of reduction by passing hydrogen over the catalysts while heating the catalyst at a rate of 1° C./minute to 350° C. and maintaining this temperature for 16 hours at a pressure of 1 bar. In the tests, synthesis gas consisting of 2.1:1 H$_2$:CO (+3 vol%N$_2$) was passed over 1-2 g of the catalyst diluted 1:5 with SiC at 20 bar at the desired temperature and space velocity. The space velocity was usually varied to keep the CO conversion between 40 and 70%. Products from the reactor were sent to a gas chromatograph with FID and TCD detectors for analysis, and methane analysed on both detectors was used as a link in the calculations.

In order to investigate the influence of $\chi$ on C5+ selectivity, catalysts 9-13 were tested under the same reaction conditions as employed by Iglesia et al.

The results are given in Table 1b and illustrated graphically in FIG. 1 and compared to the results of Iglesia et al. FIG. 1 shows the effect of $\chi$ on C5+ selectivity using 20%Co1%Re-1RE/γ-Al$_2$O$_3$ catalyst (8% dispersion, 60% porosity, average particle size (microns): 46, 113, 225, 363, 638).

The sharp decrease in C5+ selectivity at $\chi$-values above ca. 1000·10$^{16}$ m$^{-1}$ is caused by intraparticle diffusion limitations for H$_2$ and CO, as explained by Iglesia et al. However, in the present context it is more important to notice that the C5+ selectivity of high surface area alumina-supported Example 3

Cobalt Catalysts Supported on Alumina With Different Surface Area and Phase Composition Alumina supports with different surface area and alumina phase composition were prepared by heat treatment at different temperatures as described in Example 1. The catalysts also contained varying amounts of cobalt and promoters. The catalysts were tested in a fixed-bed reactor using the same equipment and procedures as described in Example 2. The results for all of the catalysts are shown in Table 2 and illustrated in FIGS. 2, 3 and 4.

Figure 2:
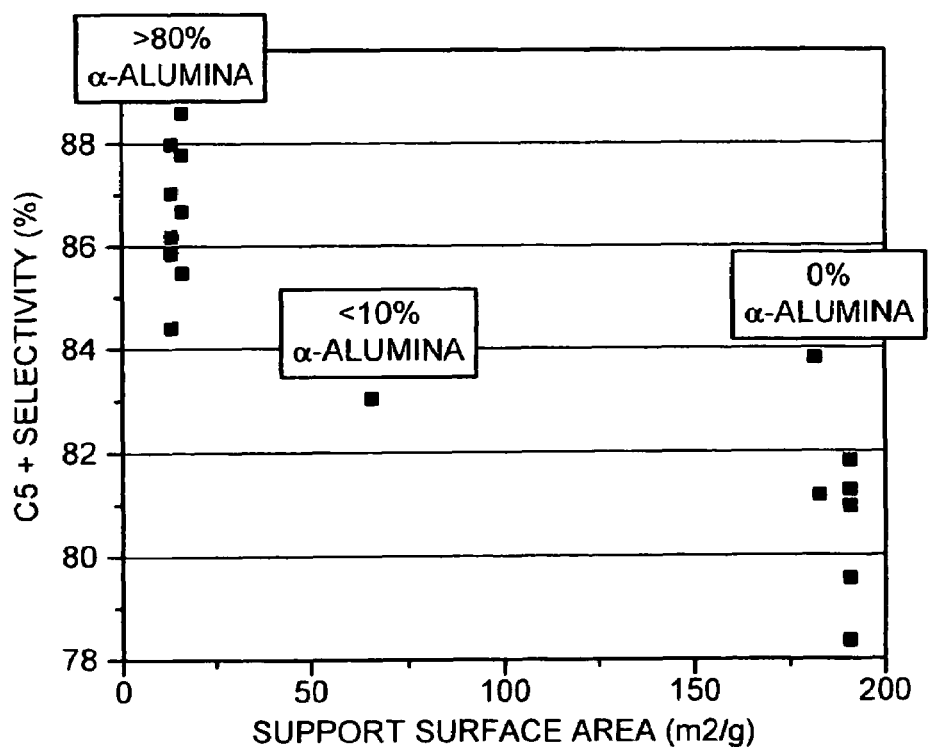
FIG. 2 is a graph showing the effect of support surface area on $C_5+$ selectivity.
Figure 3:
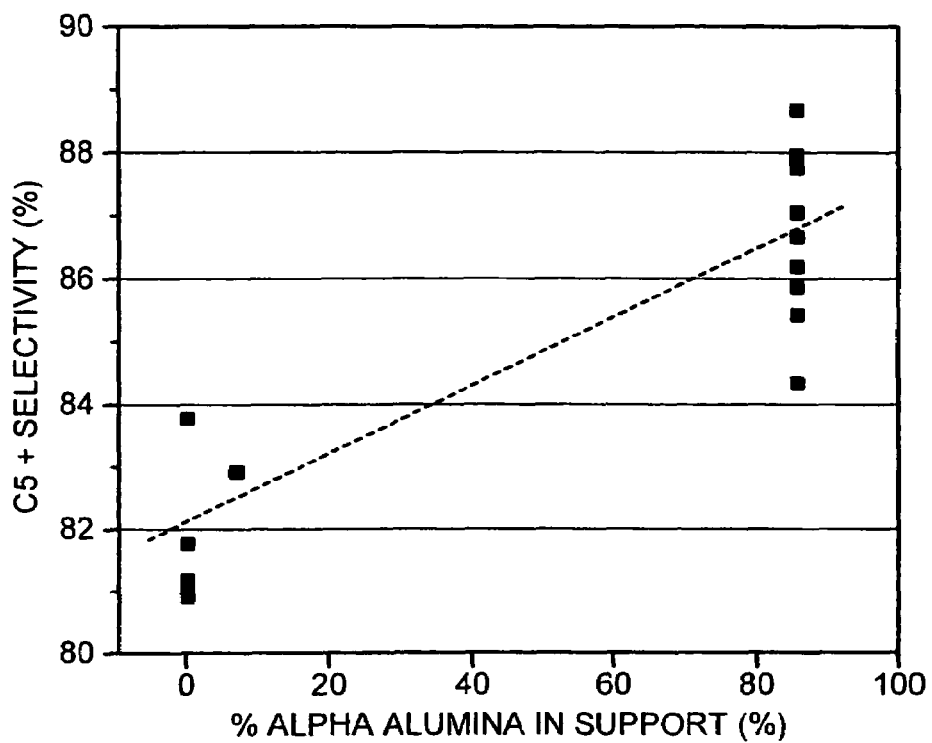
FIG. 3 is a graph showing C5+ selectivity as a function of % $\alpha$ $Al_2O_3$ in the support.

FIGS. 2 and 3 show the C5+ selectivity for all of the catalysts with $\chi$<150·10$^{16}$ m$^{-1}$ (i.e. all catalysts with small particles) as a function of support surface area or α-alumina content. Although there is some apparent spread in the data, it is quite clear that the low surface area/high α-alumina catalysts show significantly higher C5+ selectivities than high surface area γ-alumina supported catalysts. It is also evident that the effect is more significant at surface areas below ca. 50 m2/g and α-alumina content above ca. 10%.

Note also that the Schulz-Flory growth parameter (α) is increased for catalysts using low surface area alumina with a high content of α-alumina (see catalyst 2,3 and 4 in Table 2). The increase from in a from 0.92 to 0.94 gives an increase in wax (C19+) yield (in % of the total hydrocarbon production) of more than 10% units (from below 50% to above 60%).

Figure 4:
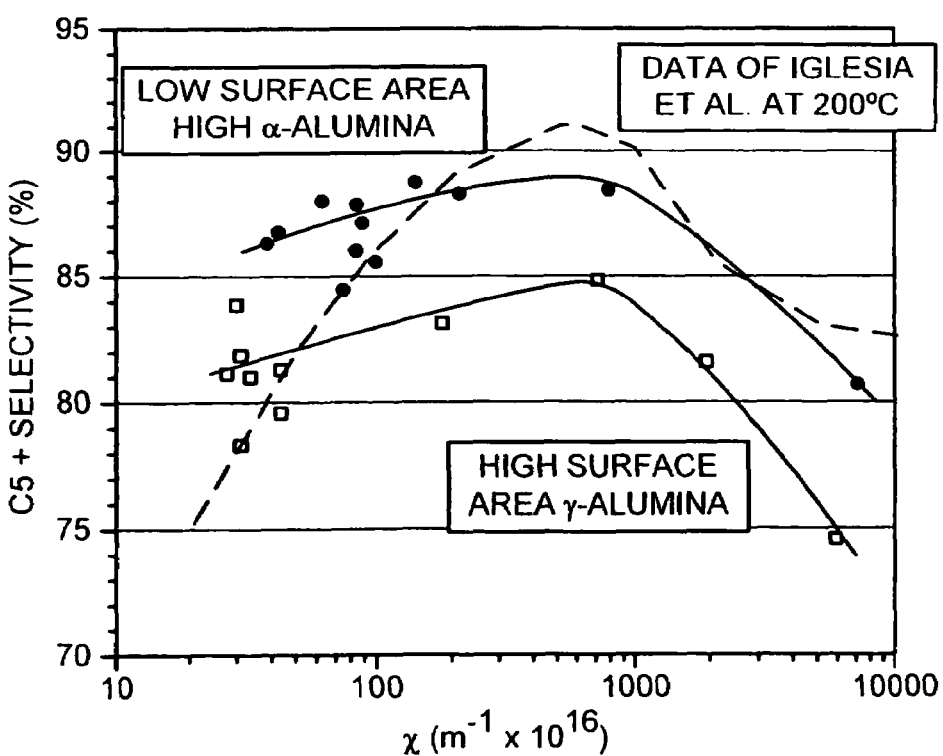
FIG. 4 is a graph showing the effect of $\chi$ on C5+ selectivity using $Al_2O_3$ supported Co catalysts.

FIG. 4. shows a plot of C5+ selectivity as a function of $\chi$ for catalysts from Table 2. It is evident that two parallel curves arise from the data, one for high surface area γ-alumina supports and another for low surface area alumina with a high content of α-alumina. The latter shows on the average 4-6% units higher C5+ selectivity than the former for all values of $\chi$. The apparent spread in data in FIGS. 2-4 will be further explained by Examples 4 and 5.

TABLE 2

Properties and results from catalytic tests of materials described in table 1.
Reaction conditions: Fixed-bed reactor at 210° C., 20 bar, feed $H_2/CO = 2.1$,
40-70% conversion, about 100 hrs on stream

| Cat. | Composition (wt %) | Support treatment temp. (° C.) | Alumina phase (% α) | Surface area (m²/g) | Porosity | Co dispersion (%) | Mean particle size (microns) | $\chi$ m$^{-1}$ (× 10$^{16}$) | GHSV[2] (h$^{-1}$) | CO conv. (%) | Reaction rate[3] (g/g/h) | Selectivity[1] (%) CH$_4$ | C$_2$-C$_4$ | C$_5$+ | α[4] α |
|---|---|---|---|---|---|---|---|---|---|---|---|---|---|---|---|
| 1 | 20% Co-1% Re | 500 | 0 | 183 | 0.65 | 8.3 | 46 | 27 | 7 100 | 43 | 0.61 | 8.8 | 10.1 | 81.1 | — |
| 2 | 12% Co-0.5% Re | 500 | 0 | 191 | 0.75 | 11.2 | 64 | 30 | 5 100 | 49 | 0.50 | 9.1 | 9.2 | 81.8 | 0.92 |
| 2b | 12% Co | 500 | 0 | 191 | 0.75 | 9.8 | 72 | 33 | 4 700 | 46 | 0.43 | 9.4 | 10.1 | 80.9 | — |
| 2c | 20% Co | 500 | 0 | 191 | 0.75 | 7.5 | 72 | 43 | 6 200 | 45 | 0.55 | 9.7 | 10.8 | 79.5 | — |
| 2d | 20% Co-1% Re | 500 | 0 | 191 | 0.75 | 10.5 | 72 | 43 | 8 400 | 46 | 0.77 | 9.3 | 9.9 | 81.2 | — |
| 3 | 12% Co-0.5% Re | 1 100 | 7 | 66 | 0.64 | 12.4 | 72 | 60 | 5 500 | 50 | 0.54 | 8.4 | 8.7 | 83.0 | 0.92 |
| 4 | 12% Co-0.5% Re | 1 150 | 86 | 16 | 0.24 | 10.2 | 64 | 83 | 3 900 | 55 | 0.43 | 6.8 | 5.4 | 87.8 | 0.94 |
| 4a | 12% Co-0.5% Re | 1 150 | 86 | 16 | 0.24 | 10.2 | 84 | 139 | 4 300 | 53 | 0.45 | 6.0 | 5.3 | 88.7 | — |
| 4b | 12% Co | 1 150 | 86 | 13 | 0.19 | 6.8 | 72 | 74 | 3 100 | 48 | 0.30 | 8.2 | 8.0 | 83.8 | — |
| 5 | 5% Co-0.25% Re | 1 150 | 86 | 13 | 0.19 | 8.5 | 72 | 38 | 1 700 | 45 | 0.15 | 7.5 | 6.3 | 86.2 | — |
| 6 | 8% Co-0.4% Re | 1 150 | 86 | 13 | 0.19 | 8.6 | 72 | 62 | 2 900 | 45 | 0.26 | 6.6 | 5.4 | 88.0 | — |
| 7 | 10% Co-0.5% Re | 1 150 | 86 | 13 | 0.19 | 9.6 | 72 | 87 | 3 700 | 48 | 0.36 | 6.8 | 6.1 | 87.1 | — |
| 8 | 20% Co-1% Re | 1 150 | 86 | 16 | 0.24 | 5.7 | 72 | 98 | 4 600 | 47 | 0.43 | 7.6 | 6.9 | 85.5 | — |
| 9 | 20% Co-1% Re*[)] | 500 | 0 | 182 | 0.60 | 8 | 46 | 29 | 4 800 | 54 | 0.51 | 6.8 | 9.4 | 83.8 | — |
| 10 | 20% Co-1% Re*[)] | 500 | 0 | 182 | 0.60 | 8 | 112 | 177 | 3 800 | 55 | 0.41 | 7.1 | 9.7 | 83.1 | — |
| 11 | 20% Co-1% Re*[)] | 500 | 0 | 182 | 0.60 | 8 | 225 | 707 | 4 500 | 56 | 0.49 | 7.1 | 8.1 | 84.8 | — |
| 12 | 20% Co-1% Re*[)] | 500 | 0 | 182 | 0.60 | 8 | 363 | 1 836 | 5 000 | 62 | 0.62 | 10.4 | 8.1 | 81.5 | — |
| 13 | 20% Co-1% Re*[)] | 500 | 0 | 182 | 0.60 | 8 | 638 | 5 678 | 4 500 | 56 | 0.50 | 16.8 | 8.6 | 74.6 | — |
| 13b | 12% Co-0.5% Re | 1 150 | 86 | 7 | 0.11 | 7 | 113 | 207 | 3 000 | 52 | 0.31 | 6.9 | 4.8 | 88.3 | — |
| 13c | 12% Co-0.5% Re | 1 150 | 86 | 6 | 0.11 | 6.6 | 225 | 781 | 3 000 | 49 | 0.29 | 6.7 | 4.9 | 88.4 | — |
| 13d | 12% Co-0.5% Re | 1 150 | 86 | 7 | 0.08 | 7.7 | 613 | 6 978 | 3 400 | 49 | 0.34 | 13.4 | 6 | 80.6 | — |
| 14 | 12% Co-0.3% Pt | 1 150 | 86 | 13 | 0.19 | 7.7 | 72 | 84 | 3 400 | 51 | 0.34 | 7.3 | 6.8 | 85.9 | — |
| 15 | 12% Co-0.3% Pt | 500 | 0 | 191 | 0.75 | 8.8 | 72 | 30 | 4 300 | 46 | 0.39 | 10.3 | 10.4 | 78.3 | — |

*[)]Catalysts containing also 1% rare earth oxide ($La_2O_3$.)
[1]Carbon selectivity, $CO_2$ free basis. (<1% $CO_2$ in all experiments)
[2]Space velocity: Ncm³ ($H_2$ + CO + inerts)/g catalyst/hour. (3 vol % inerts ($N_2$) were used in all tests)
[3]g $C_1$ + hydrocarbons per g of catalyst per hour
[4]Schultz-Flory chain propagation probability, measured in the $C_{30}$-$C_{50}$ range.
[5]The CO dispersion has been measured by $H_2$-chemisorption for catalyst 9-13.
The CO dispersion for all other catalysts has been calculated by assuming the same site time yield as for catalyst 9-13.

Example 4

The Effect of Cobalt Loading on Alumina With Different Surface Area and Phase Composition The tests in Example 4 were fixed bed reactor tests at: 210° C., 20 bar, $H_2/CO=2.1$, 45-55% conversion, ca. 100 h on stream.

Figure 5:
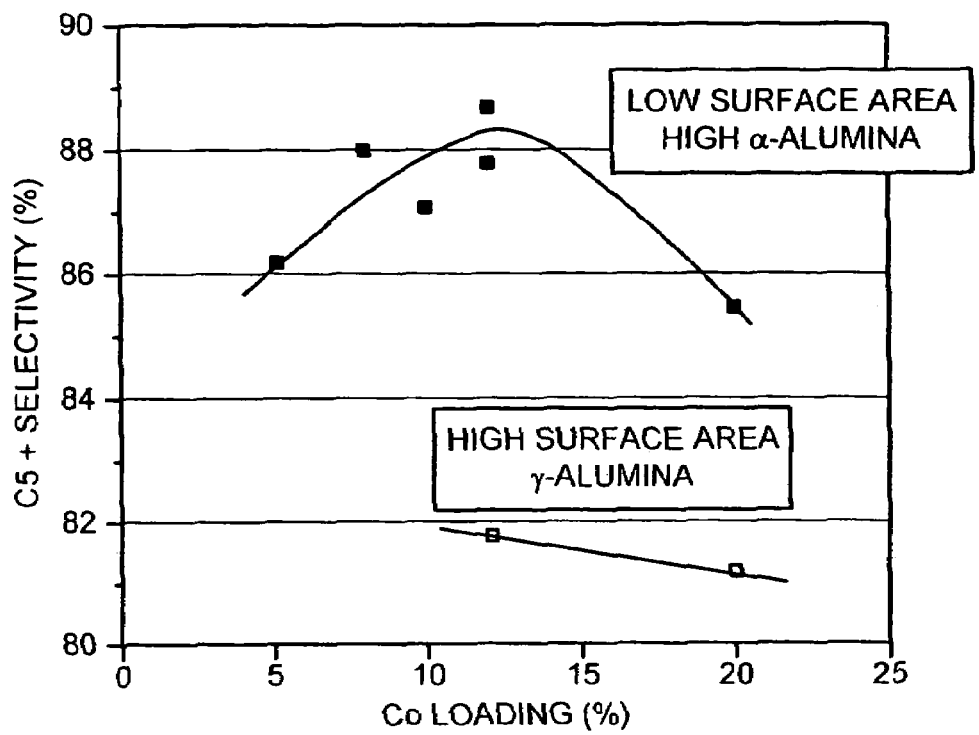
FIG. 5 is a graph showing the effect of cobalt loading on $C_5+$ selectivity using $Al_2O_3$ supported cobalt catalysts.
Figure 6:
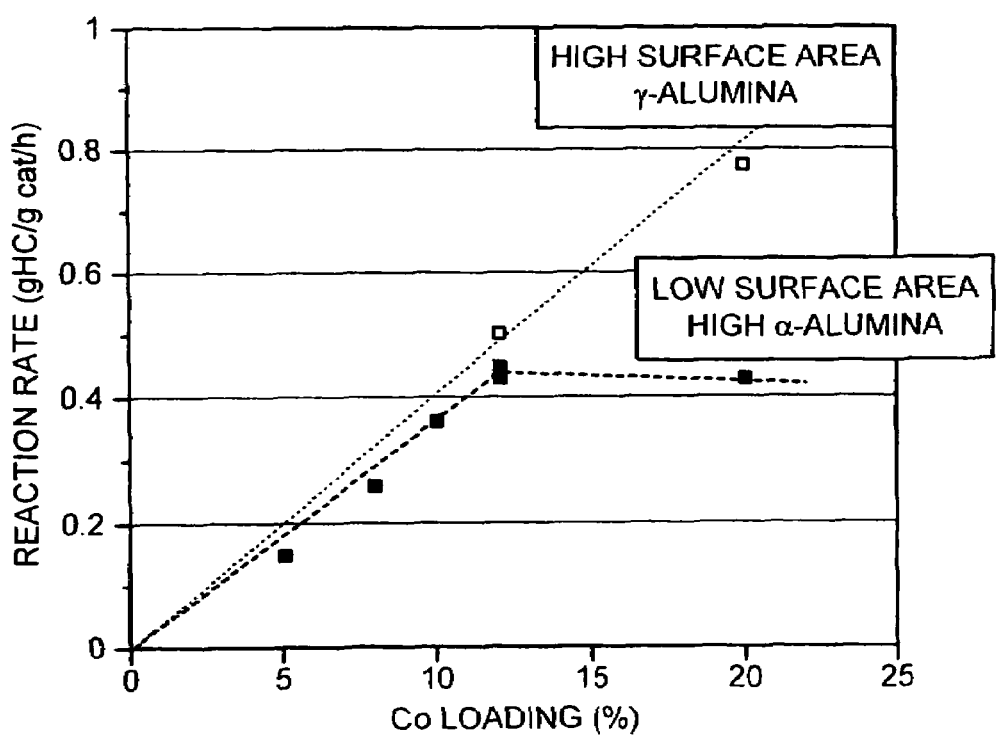
FIG. 6 is a graph showing the effect of cobalt loading on catalyst productivity using $Al_2O_3$ supported cobalt catalysts.

The results indicate that there is an optimum loading of cobalt for a given alumina surface area. A more thorough examination of the results in Example 3 shows that some of the low C5+ selectivities for low surface area/high α-alumina supports are caused by too high loading of cobalt. This is illustrated in FIGS. 5 and 6. FIG. 5 shows the effect of cobalt loading on C5+ selectivity and FIG. 6 the effect on catalyst productivity using $Al_2O_3$ supported cobalt catalysts with different surface area/α-alumina content.

At 20% Co loading, there is a smaller gain in C5+ selectivity by using low-surface area/high α-alumina support (FIG. 5). This is also clearly shown by examining the influence of Co loading on catalyst activity, as illustrated by the hydrocarbon production rate at these reaction conditions (FIG. 6). In spite of the much lower surface area and pore volume of the catalysts according to the invention, the cobalt utilisation is as good as for high surface area supports up to about 12% Co, after which it is apparent that the support can not effectively disperse the additional active metal.

However, the results are not intended to limit the invention to Co loadings below 12%, but merely to illustrate that there is an optimum level for each set of support properties. It is well known that the accommodation of active metal in supports can be varied and optimised by the method of impregnation, the type of cobalt precursor, the solvent used, the number of impregnation steps and the conditions for pretreatment of the catalyst to mention only a few.

Example 5

The Effect of Metal Promoters

Although the results show a marked effect of surface area/α-alumina content for all of the catalysts, it is clear that there is synergy between the use of a metal promoter such as Re or Pt and the support properties. This is illustrated in Table 3, showing that the effect of low surface area/high α-alumina supports is clearly larger for the Pt and Re promoted catalysts compared to the unpromoted catalyst.

In order to make sure that the observed effect of promoters were not caused by secondary factors ($\chi$) through the higher activity (dispersion) of these catalysts, experiments with Re promoted catalysts with lower Co loading and thus lower activity (and $\chi$) were also performed. The results are given in Table 4, showing the positive effect of Re for catalysts with virtually constant activity (and $\chi$-value).

TABLE 3

Difference in C5+ selectivity (ΔC5+) between low surface area/high α-alumina and high surface area/γ-alumina based Co catalysts, with and without promoter. Catalyst sample numbers refer to Tables 1 and 2. Fixed bed reactor tests at: 210° C., 20 bar, $H_2/CO$ = 2.1, 45-55% conversion, ca. 100 h on stream).

| Catalysts (no.) | ΔC5+ (%) |
| --- | --- |
| 12Co (2b/4b) | 3.5 |
| 12Co0.5Re (2/4) | 6.0 |
| 12Co0.3Pt (15/14) | 7.6 |

TABLE 4

Reaction rate and C5+ selectivity for catalysts supported on low surface area/high α - alumina with near-constant χ. Catalyst sample numbers refer to Table 1 and 2. Fixed bed reactor tests at: 210° C., 20 bar, $H_2/CO$ = 2.1, 45-55% conversion, ca. 100 h on stream).

| Cat. | Composition (wt %) | χ ($m^{-1} \times 10^{16}$) | Reaction rate (gHC/gcat/h) | Select. C5+ (%) |
| --- | --- | --- | --- | --- |
| 4b | 12% Co | 74 | 0.30 | 83.8 |
| 4 | 12% Co-0.5% Re | 83 | 0.43 | 87.8 |
| 6 | 8% Co-0.4% Re | 62 | 0.26 | 88.0 |
| 7 | 10% Co-0.5% Re | 87 | 0.36 | 87.1 |

Example 6

Water-Gas Shift Activity

The water gas shift reaction ($CO+H_2O=CO_2+H_2$) is generally an unwanted side reaction to the main hydrocarbon synthesis formation. The water gas shift activity of the catalysts was tested by adding water (steam) to the feed in fixed-bed catalyst testing experiments otherwise similar to the experiments described in Example 2. This has the advantage that the water partial pressure is higher and more uniform over the reactor and thus facilitates interpretation of the data.

Typical results for catalysts with low surface area/high α-alumina and high surface area/γ-alumina are shown in Table 5.

Although most cobalt catalysts have relatively low water gas shift activity, the results show that the catalysts according to the invention have still significantly lower (a factor of 2) $CO_2$ formation rates compared to catalysts supported on high surface area/γ-alumina.

TABLE 5

$CO_2$ selectivity for low surface area/high α-alumina and high surface area/γ-alumina based Co-Re catalysts. Catalyst sample numbers refer to Table 1 and 2. Fixed bed reactor tests at: 210° C., 20 bar. Feed composition (molar): 50.5% $H_2$, 24% CO, 22-23% $H_2O$, balance $N_2$), 40-50% conversion, 100-200 h on stream).

| Cat. | Composition (wt %) | Support surface area ($m^2/g$) | % α-$Al_2O_3$ | $CO_2$ select. (%) | $CO_2$ formation rate (mmole/$g_{cat}$/h) |
| --- | --- | --- | --- | --- | --- |
| 2 | 12% Co-0.5% Re | 191 | 0 | 0.56 | 0.156 |
| 4 | 12% Co-0.5% Re | 16 | 86 | 0.28 | 0.087 |

Example 7

Slurry Reactor Experiments

A catalyst according to the invention was also tested in slurry reactor in order to verify the selectivity advantage also under the conditions typical of such reactors. Results are shown in Table 6.

At virtually identical reaction conditions, the low surface area/high α-alumina supported catalyst show almost 7% increase in C5+ selectivity(compared to a typical high surface area/γ-alumina based catalyst), which is even more significant than found in the fixed-bed reactor tests. The slurry reactor tests also confirm the difference in CO2 selectivities as described in Example 6.

TABLE 6

Results from tests of $Al_2O_3$ supported Co catalysts (38-53 micron particles) in a 2 L stirred slurry reactor (CSTR). T = 220° C., P = 20 bar, feed $H_2/CO$ = 2.0, 3% inerts ($N_2$) in feed. Results after > 100 h on stream.

| Catalyst | Catalyst surface area ($m^2/g$) | CO conv. (%) | Selectivity (% C, $CO_2$ free basis) | | | $CO_2$ Selectivity (%) |
| --- | --- | --- | --- | --- | --- | --- |
| | | | $CH_4$ | $C_2$-$C_4$ | $C_5+$ | |
| 20% Co-1% Re-1% RE* | 140 | 77.4 | 8.3 | 7.8 | 83.9 | 2.7 |
| 12% Co-0.5% Re | 25 | 77.7 | 5.3 | 3.8 | 90.8 | 1.1 |

*RE = Rare earth oxide ($La_2O_3$)

Example 8

The Effect of Water

The following example will illustrate that the positive influence of the invention on C5+ selectivity is not dependent on the level of water concentration (steam partial pressure) in the reactor. Water is a product of the Fischer-Tropsch reaction and its partial pressure in the reactor will therefore be dependent on the conversion level. The following experiments were carried out in order to investigate the effect of conversion on selectivity for a catalyst representative of the invention and a comparative sample. In addition, experiments with addition of water (steam) to the reactor were carried out to further probe the effect of water. The experiments were carried out in a fixed-bed reactor using the same experimental procedures as described in Example 2, apart from the addition of water and the deliberate variation of space velocity to influence conversion levels. The results are shown in Table 7.

It is evident that the effect of using low surface area/high α-alumina supports is independent on water partial pressure.

TABLE 7

The effect of water partial pressure on C5+ selectivity for low surface area/high α-alumina and high surface area/γ-alumina based Co—Re catalysts. Catalyst sample numbers refer to Table 1 and 2. Fixed bed reactor tests at: 210° C., 20 bar, $H_2/CO = 2.1$, 500-600 h on stream.

| Cat. No. | Catalyst descr. | CO conversion (%) | Inlet $H_2O$ partial pressure (bar) | Average $H_2O$ partial pressure (bar) | $C_5+$ selectivity (%) | $\Delta C_5+$ Selectivity[1] (%) |
|---|---|---|---|---|---|---|
| 4 | 12% Co-0.5% Re 16 m²/g 86% α-alumina | 24 | 0 | 0.9 | 86.4 | 5.4 |
|   |   | 50 | 0 | 2.2 | 88.4 | 4.6 |
|   |   | 76 | 0 | 4.2 | 90.0 | 5.3 |
|   |   | 30 | 4.6 | 5.8 | 91.4 | 5.6 |
| 2 | 12% Co-0.5% Re 191 m²/g 0% α-alumina | 21 | 0 | 0.8 | 81.0 | — |
|   |   | 50 | 0 | 2.2 | 83.8 | — |
|   |   | 74 | 0 | 4.0 | 84.7 | — |
|   |   | 22 | 4.6 | 5.3 | 85.8 | — |

[1]C5+ selectivity advantage of catalyst 4 compared to catalyst 2 at the same conditions Example 9

Olefin Hydrogenation Activity

Iglesia et al. have shown that both olefins and paraffins are primary products of the FT reaction and that secondary hydrogenation of olefins is an undesired side reaction, because olefins are then prevented from further chain growth. A reduction in olefin hydrogenation activity without decreasing the main hydrocarbon productivity would therefore be a desired catalyst property. However, there is no guidance in the prior art as to how this property shall be implemented into a working catalyst.

More detailed analysis of the results from the fixed-bed reactor tests described in Examples 2 and 3 and other supporting tests indeed indicate that the cause of the selectivity improvement of the catalyst according to the invention is associated with a reduced activity for hydrogenation of olefins although a simultaneous reduction in the activity for termination of growing chains by hydrogenation can not be entirely excluded.

Figure 7:
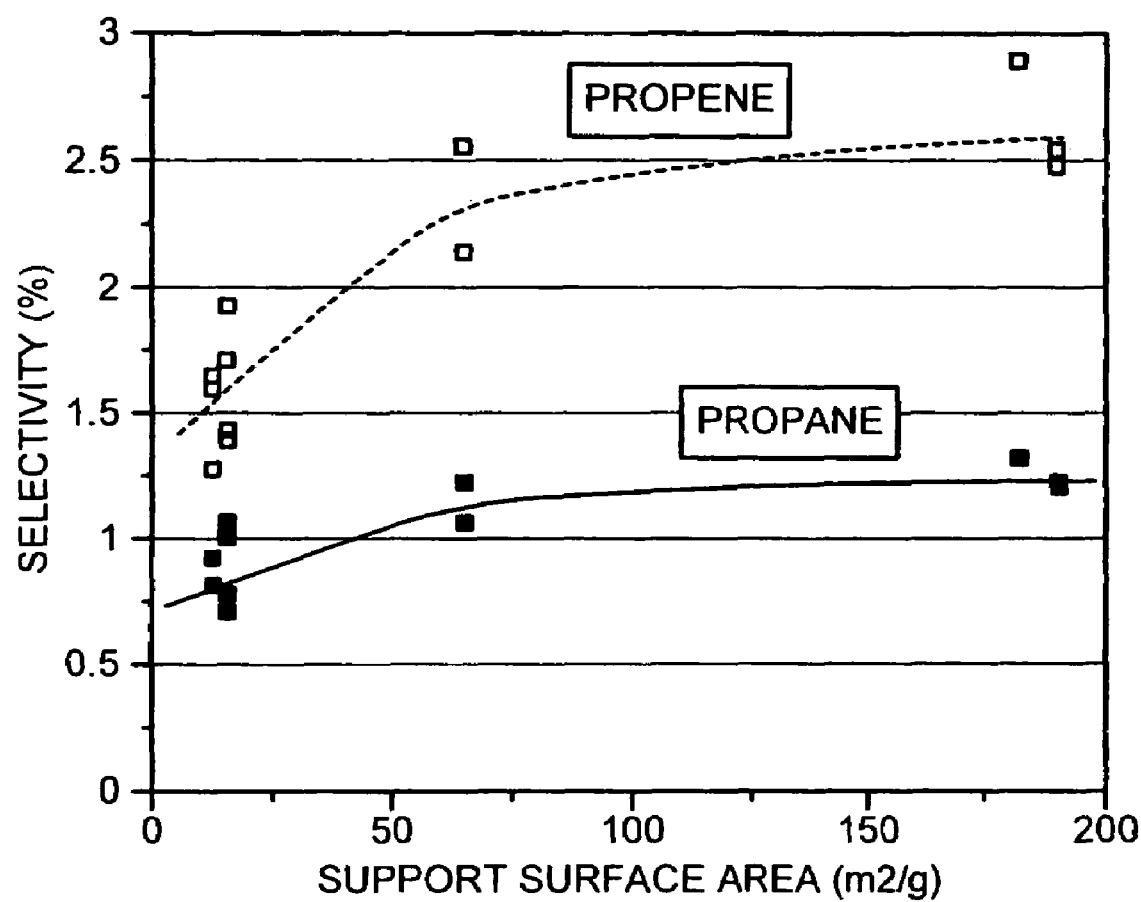
FIG. 7 is a graph showing propane and propane selectivity as a function of support surface area.
Figure 8:
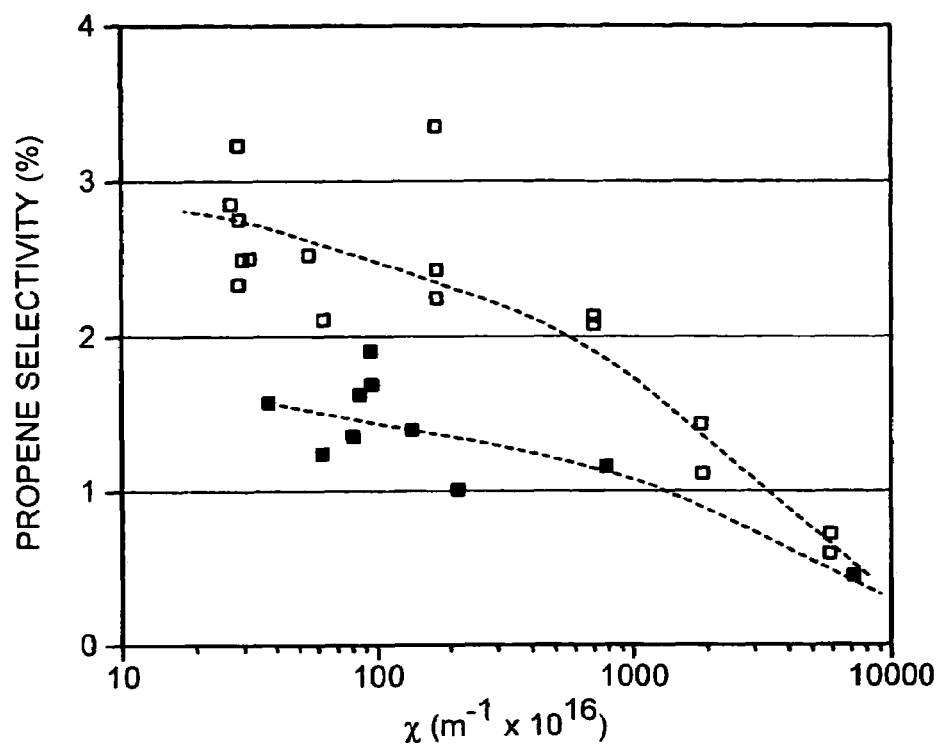
FIGS. 8 and 9 are graphs showing respectively propane and propane selectivity as a function of $\chi$ for $Al_2O_3$ supported Co catalysts.
Figure 9:
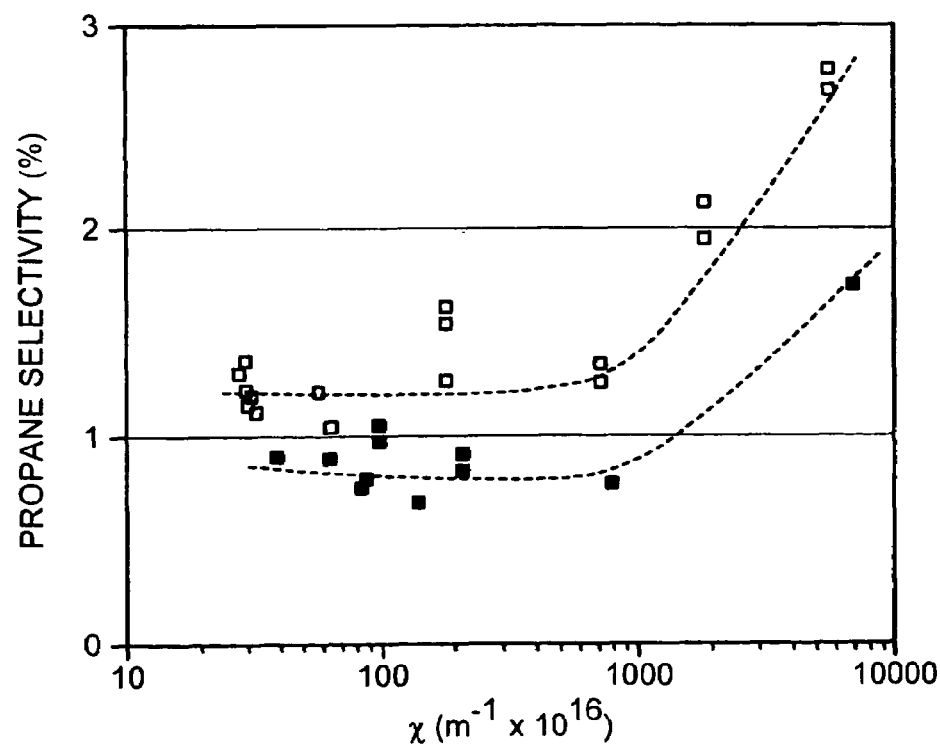

These conclusions are based on FIGS. 7 to 9. FIG. 7 shows propane and propane selectivity as a function of support surface area for Co-Re/Al₂O₃ catalysts with particle size<100 microns ($\chi$<150·10$^{16}$ m$^{-1}$). Co/Re=20-24, 5-20 wt % Co. These tests were fixed bed reactor tests at: 210° C., 20 bar, $H_2/CO$=2.1, 45-55% conversion, about 100 h on stream.

FIG. 8 shows the effect of $\chi$ on propane selectivity using Al₂O₃ supported cobalt catalysts with different surface area/α-alumina content. In this figure, open symbols represent high surface area γ-alumina support; filled symbols represent low surface area γ-alumina support. These tests were fixed bed reactor tests at: 210° C., 20 bar, $H_2/CO$=2.1, 40-70% conversion, >24 h on stream.

FIG. 9 shows the effect of $\chi$ on propane selectivity using Al₂O₃ supported cobalt catalysts with different surface area/α-alumina content. In this figure, open symbols represent high surface area γ-alumina support; filled symbols represent low surface area α-alumina support. These tests were fixed bed reactor tests at: 210° C., 20 bar, $H_2/CO$=2.1, 40-70% conversion, >24 h on stream.

Thus, these Figures show decreased light paraffin selectivity for low surface area/high α-alumina supported catalysts and indicate that the activity for olefin hydrogenation is reduced for catalysts according to the invention. (Propane/propane has been selected here as representative of light olefin/paraffin products. Similar effects are observed for other light products). FIG. 7 shows that although propane selectivity is reduced for low surface area/high α-alumina supported catalysts, this is not accompanied by an increase in the production of the corresponding paraffin (propane).

A similar effect is observed when $\chi$ is increased by increasing particle size (FIGS. 8 and 9). When $\chi$ is increased by increasing the particle size, the olefin (propane) selectivity is continuously decreasing as a result of olefins being converted into secondary products. Propane selectivity starts to increase at a $\chi$-value of about 1000×10$^{16}$ m$^{-1}$, indicating that light olefins are converted to the corresponding paraffin. This is a result of diffusion resistance on the reactants ($H_2$, CO) leading to low CO concentrations in the catalyst pores and thus conditions more favorable for secondary olefin hydrogenation. Although the results show that this reaction can not be blocked totally for the catalysts according to the invention, the tendency for propane formation is lower for all $\chi$-values.

Thus, the present invention describes a way of decreasing the olefin hydrogenation activity of a Fischer-Tropsch catalyst without significantly altering the main hyodrocarbon synthesis activity.

In addition to the indirect evidence described above, direct evidence for reduced olefin hydrogenation activity for the catalysts according to the invention was found by performing separate olefin hydrogenation experiments. Selected catalysts prepared and pretreated according to the procedures described in Examples 1 to 2 were tested in a fixed-bed reactor for propane hydrogenation activity. The results are shown in Table 8. The olefin hydrogenation rate for a low surface area/high α-alumina based catalyst is more than a factor of 2 lower than the catalysts included for comparison.

TABLE 3

Propene hydrogenation activity of 12% Co-0.5% Re/Al₂O₃ with different surface area and phase composition. T = 120° C., P = 1 atm. Feed consisting of 0.2 vol % propene, 1.3 vol % $H_2$ and balance He (diluent).

| Cat. | Surface area (m²/g) | α - Al2O3 (%) | Propane formation rate (g/g cat./h) |
|---|---|---|---|
| 2 | 191 | 0 | 1.1 |
| 3 | 66 | 7 | 1.1 |
| 4 | 16 | 86 | 0.4 |

The invention claimed is:

1. A catalyst for use in a Fischer-Tropsch synthesis reaction, the catalyst comprising catalyst particles comprising cobalt supported on an alumina support, wherein the alumina support has a specific surface area of less than 50

$m^2/g$, and wherein the catalyst particles have an average particle size of between 0.01 mm and 0.2 mm.

2. The catalyst of claim 1 wherein the specific surface area of the alumina support is less than 30 $m^2/g$.

3. The catalyst of claim 1, wherein the alumina support comprises at least 50% alpha-alumina.

4. The catalyst of claim 3, wherein the alumina support is substantially pure alpha-alumina.

5. The catalyst of claim 1, wherein cobalt represents from 3 to 35% by weight of the catalyst.

6. The catalyst of claim 5, wherein the cobalt represents from 5 to 20% by weight of the catalyst.

7. The catalyst of claim 5, further comprising a promoter that comprises rhenium and is present as 0.5 to 50% of the cobalt content.

8. The catalyst of claim 5, further comprising a promoter that is a member selected from the group consisting of platinum, rhodium, iridium, and combinations thereof, wherein the promoter is present as 0.1 to 50% of the cobalt content.

9. The catalyst of claim 1, further comprising a promoter.

10. The catalyst of claim 9, wherein the promoter comprises a member selected from the group consisting of rhenium, platinum, rhodium, iridium, and combinations thereof.

11. The catalyst of claim 1, comprising up to 2% rhenium by weight of the catalyst in total.

12. A catalyst for use in a Fischer-Tropsch synthesis reaction, the catalyst comprising cobalt supported on an alumina support, wherein the alumina support has a specific surface area of less than 50 $m^2/g$, and wherein the alumina support comprises at least 10% alpha-alumina.

13. The catalyst of claim 12 wherein the catalyst comprises 3 to 35% by weight cobalt.

14. The catalyst of claim 12 wherein the catalyst further comprises a promoter chosen from the group consisting of rhenium, platinum, rhodium, iridium, and combinations thereof.

15. The catalyst of claim 14 wherein the promoter is present as 0.1 to 50% by weight of the cobalt content.

16. The catalyst of claim 12 further comprising rhenium present at less than 2% by weight of the catalyst.

17. A catalyst for use in a Fischer-Tropsch synthesis reaction, the catalyst comprising catalyst particles comprising cobalt supported on an alumina support, wherein the alumina support has a specific surface area of less than 50 $m^2/g$, and wherein the catalyst particles have an average particle size of between 0.1 mm and 10 mm.

18. The catalyst of claim 17, wherein the catalyst particles have an average particle size of between 0.5 and 5 mm.

* * * * *